United States Patent [19]
Caraway

[11] 3,880,506
[45] Apr. 29, 1975

[54] ADJUSTABLE SPEED PROJECTOR WITH SYNCHRONIZED SOUND RECORDER

[76] Inventor: Guy C. Caraway, Downey, Calif.

[22] Filed: Aug. 20, 1973

[21] Appl. No.: 389,957

Related U.S. Application Data

[62] Division of Ser. No. 242,470, Apr. 10, 1972, Pat. No. 3,779,632, which is a continuation-in-part of Ser. No. 89,861, Nov. 16, 1970, and a continuation-in-part of Ser. No. 91,061, Nov. 19, 1970.

[52] U.S. Cl. ............... 352/194; 352/169; 352/195; 352/196
[51] Int. Cl. ...................... G03b 21/38; G03b 21/12
[58] Field of Search .......... 352/194, 195, 196, 169; 354/173

[56] References Cited
UNITED STATES PATENTS

| | | | |
|---|---|---|---|
| 2,153,142 | 4/1939 | Fairbanks | 352/194 |
| 3,647,125 | 3/1972 | Cator et al. | 352/194 X |
| 3,675,996 | 7/1972 | Wilsch et al. | 352/194 |
| 3,702,730 | 11/1972 | Russell | 352/194 X |
| 3,762,806 | 10/1973 | Roth et al. | 352/169 |

*Primary Examiner*—Samuel S. Matthews
*Assistant Examiner*—Russell E. Adams, Jr.
*Attorney, Agent, or Firm*—Darby & Darby

[57] ABSTRACT

An adjustable speed projector including a continuously running shutter for repetitively interrupting the projection light path at a rate which is independent of the film frame rate, a source of film frame advance signals having a repetition rate controllable by an operator, and means for advancing a film by one frame in response to each advance signal at a time corresponding to the next succeeding interruption of the projection light path by the shutter so that the film is in motion only at times when the shutter interrupts the light path. The film-advancing mechanism includes a continuously rotating drive wheel, a driven wheel which is caused to engage the drive wheel for one cycle in response to each actuating signal, and a claw, one end of which is eccentrically mounted on the driven wheel and the other end of which engages a film sprocket hole to advance the film by one frame for each cycle of the driven wheel. A single spring urges the driven wheel into engagement with the drive wheel and also urges the claw into engagement with the film and against a lateral guide surface. Two-channel recording and playback apparatus is provided so that film frame advance signals recorded in synchronism with a sound track may be used to control the projector in the playback mode.

9 Claims, 16 Drawing Figures

ADJUSTABLE SPEED PROJECTOR WITH SYNCHRONIZED SOUND RECORDER

This application is a division of application Ser. No. 242,470, filed Apr. 10, 1972, now Pat. No. 3,779,632, which is a continuation-in-part of my copending patent application Ser. No. 89,861, filed Nov. 16, 1970, and a continuation-in-part of my copending application Ser. No. 91,061, filed Nov. 19, 1970.

The present invention relates to an adjustable speed projector which is capable of both single frame projection and motion picture projection at various film frame rates controllable by an operator. The present invention also relates to a projection system in which the film advancing mechanism is controlled by a separate, continuously running sound track so that the single frame duration or motion picture frame rate of the projected visual image is appropriately coordinated with the accompanying sound message.

Adjustable speed projectors have certain advantages over constant speed motion picture projectors, particularly for educational uses. For example, adjustable speed projectors permit the studying of action sequences at various "slow-motion" rates down to single frame projection of the type provided by slide projectors. Further, when the projected image is to be accompanied by a pre-recorded sound message from a separate, continuously running sound track, considerable savings in film can be achieved, particularly in instances when the program calls for a single frame of film to be projected during a relatively long portion of the sound message.

Generally, the prior adjustable speed projectors resemble conventional constant speed projectors in that their shutter mechanisms are mechanically linked to their film advancing mechanisms. This arrangement causes several problems with respect to adjustable speed projectors. For example, one problem is that the rate of interruptions of the projection light path by the shutter, and thus the average brightness of the projected image, varies with the film frame rate.

Another problem of the prior adjustable speed projectors is that of excessive heating of the film when a single frame is projected for a prolonged period of time. Such heating may cause the film to buckle, thus defocussing the projected image, and, in extreme cases, the film may be permanently damaged or destroyed.

Still another problem of the prior adjustable speed projectors is that combined mass of the shutter mechanism and the film advancing mechanism must first be put into motion and then stopped in order to advance the film by one frame. Such operation has required a relatively complex mechanical design using relatively rugged components in order to withstand the stresses of start-and-stop action.

It is therefore an object of this invention to provide an improved adjustable speed projector which avoids the problems of prior projectors.

It is also an object of this invention to provide an adjustable speed projector including an improved system for synchronizing the shutter and film advancing mechanism.

It is another object of this invention to provide an adjustable speed projector having a film advancing mechanism of simple and reliable design.

It is still another object of this invention to provide an adjustable speed projector in which the actuation of the film advancing mechanism is controllable directly by an operator or by pre-recorded advance signals synchronized with a continuously running sound track.

It is a further object of this invention to provide an adjustable speed projector in which the brightness of the projected image is not affected by the film frame rate.

It is yet another object of this invention to provide an adjustable speed projector which reduces the problem of excessive heating of the film when a single frame is projected for a prolonged period of time.

According to the above and other objects, the present invention provides an adjustable speed projector having a continuously running shutter preferably disposed between the projection light source and the film aperture for interrupting the projection light path at a preferably constant rate independent of the film frame rate, a source of film advance signals having a repetition rate controllable by an operator, a film advancing mechanism for advancing the film by one frame in response to each advance signal at a time corresponding to the next succeeding interruption of the projection light path by the continuously running shutter so that the film is in motion only when the light path is interrupted by the shutter, thus avoiding "smearing" of the projected image. In the preferred embodiment, synchronization between the film advancing mechanism and the continuously running shutter is accomplished by means of a circuit which responds to a logical AND condition between a film advance signal and a synchronizing signal derived from the continuously rotating shutter to produce an actuating signal for the film advancing mechanism.

The use of a continuously running shutter provides a projected image of uniform brightness regardless of the film frame rate and completely avoids the mechanical problems associated with start-and-stop shutter operation. Placement of the continuously running shutter between the projection light source and the film aperture reduces the problem of excessive heating of the film when a single frame is projected for a prolonged period.

Although the present adjustable speed projector may be used as a silent projector if desired, apparatus may be provided for recording a sequence of advance signals in synchronism with a sound message on a suitable recording medium, such as a two-channel magnetic tape, so that, on playback, the actuation of the film advancing mechanism is controlled by the recorded advance signals and is thus appropriately synchronized to the sound message.

Other objects and advantages of the present invention will be apparent from the following detailed description and accompanying drawings which set forth, by way of examples, the principles of the present invention and the preferred embodiment for carrying out those principles.

The following detailed description sets forth two separate embodiments of the present invention. While both embodiments incorporate the basic principles of the present invention, the embodiment shown in FIGS. 1–3 differs in some important respects from this preferred embodiment shown in FIGS. 4–16.

Figures 1, 2, 3:
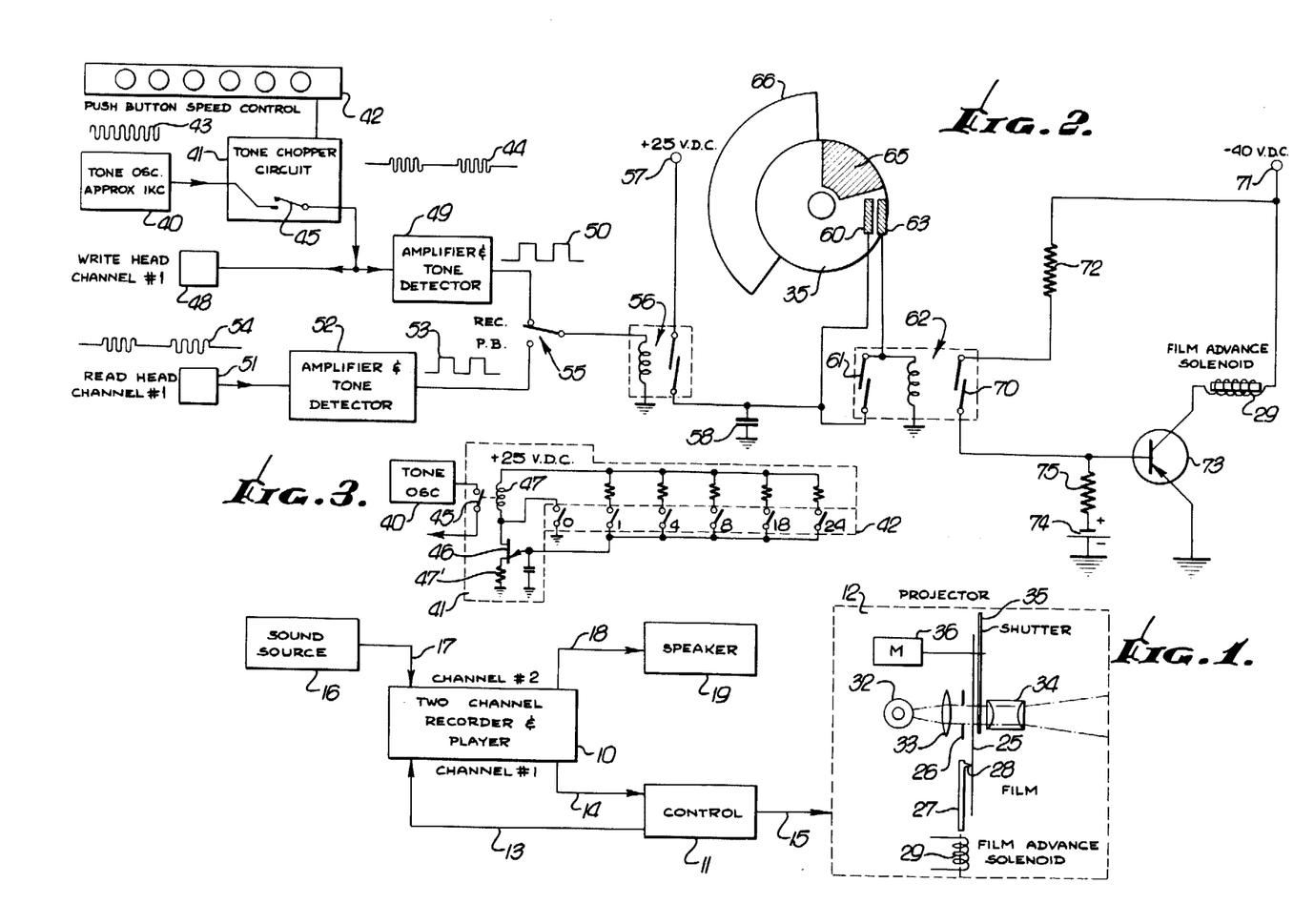
FIG. 1 is a block diagram illustrating one embodiment of an adjustable speed projector with synchronized sound according to the present invention.
FIG. 2 is a circuit diagram illustrating the control system of FIG. 1 in greater detail.
FIG. 3 is a circuit diagram illustrating in greater detail the pushbutton speed control and tone chopper circuits of FIG. 2.

Referring now to FIG. 1 of the drawings, there is shown a block diagram of a sound and film projection system including a recorder and player 10, typically a two-channel tape recorder, a control unit 11, and a film projector 12. The control unit is connected to the recorder by line 13 for writing on channel 1 and by line 14 for reading from channel 1. The control unit is connected to the projector by line 15. A sound source 16 provides the audio message for accompanying the film and is connected to the write head of channel 2 by a line 17, while a line 18 connects the read head of channel 2 to a speaker 19.

The projector 12 may be a conventional device, with certain modifications to be described herein. A film 25 is moved past an aperture 26 by a film advance claw 27. The film may be mounted in a suitable device such as a cartridge or cassette or film reel, or the like (not shown). The film advance claw 27 has a tip 28 for engaging the sprocket holes in the film and, in the embodiment shown in FIG. 1, is actuated by a solenoid 29. It will be appreciated, however, that the principles of the present invention embrace the use of other types of film-advancing mechanisms such as, for example, the preferred form of film-advancing mechanism shown in FIGS. 4 and 8–11. Each time the solenoid 29 of FIG. 1 is energized, the film advance claw 27 is pulled down and advances the film 25 by one frame.

A projection lamp 32 provides a projection light for the film via a condensing lens 33, the film aperture 26, and a projection lens 34. A shutter 35 is driven continuously by a motor 36 at a relatively high rate of speed, with the shutter having a blade for interrupting the light path to provide a blanking period for advance of the film to avoid smearing of the projected image. The rotational speed of the shutter is selected to be high enough to eliminate flicker in the projected image.

Figure 4:
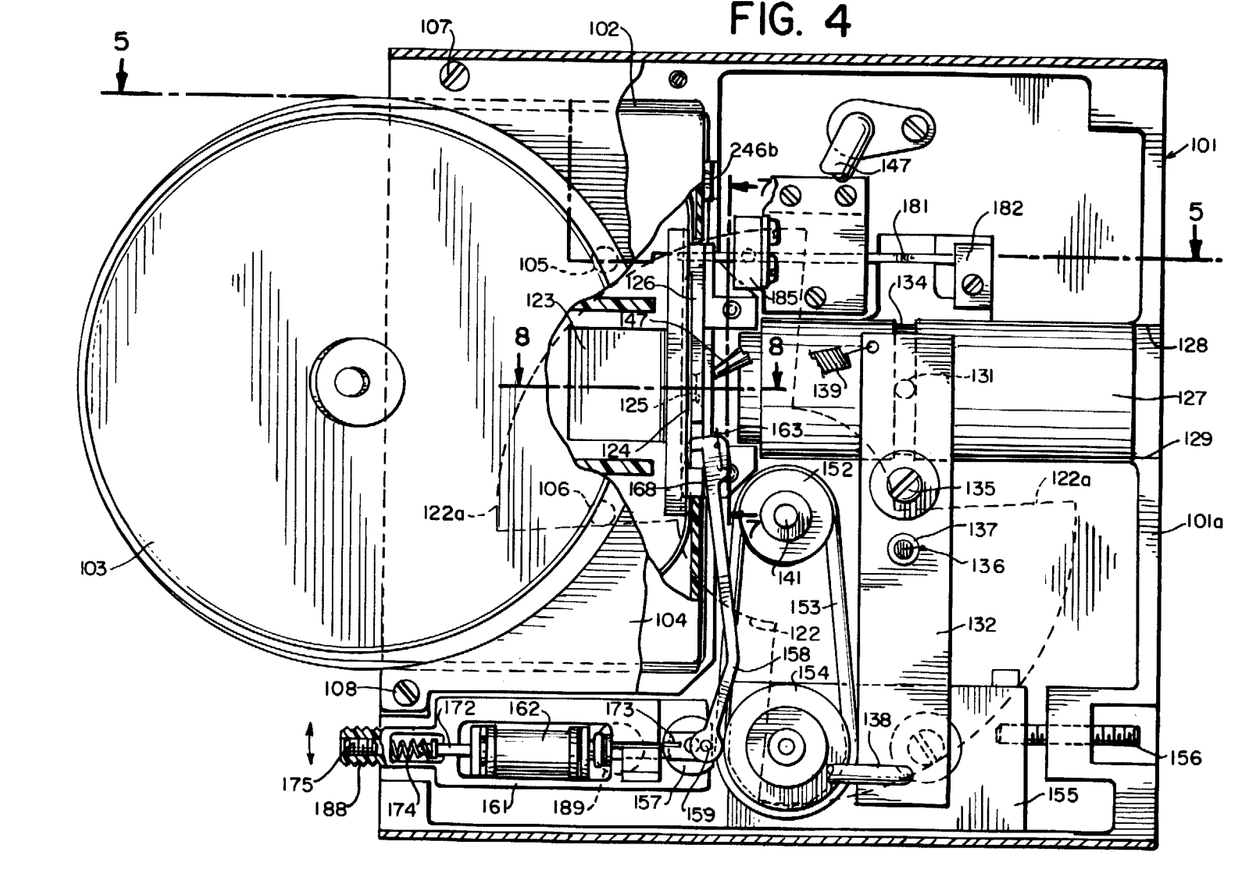
FIG. 4 is a side elevation view, partly broken away, of a preferred embodiment of the motion picture projector of the present invention.
Figure 5:
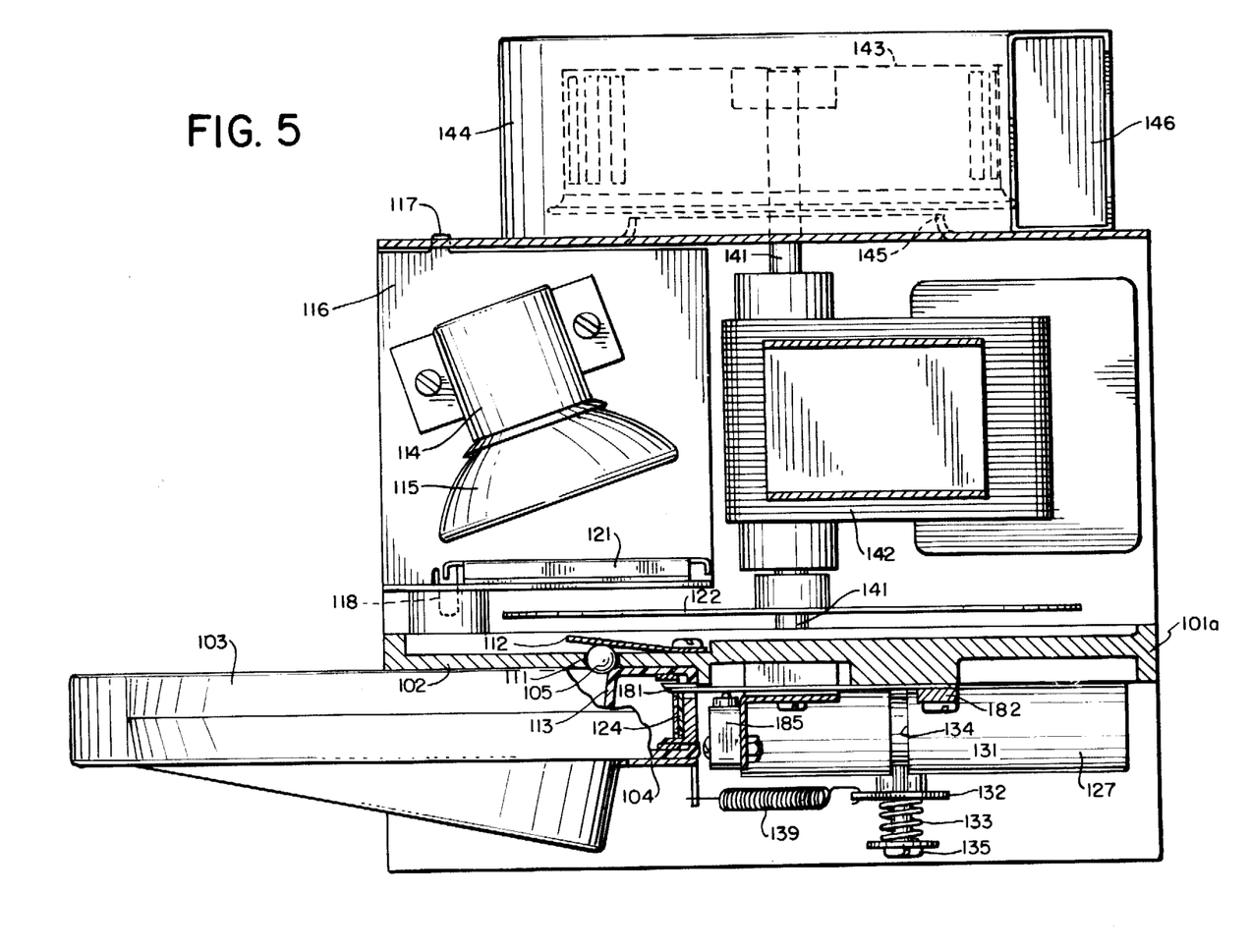
FIG. 5 is a cross-sectional view taken along the line 5—5 of FIG. 4 and showing a plan view of the subject motion picture projector.
Figure 6:
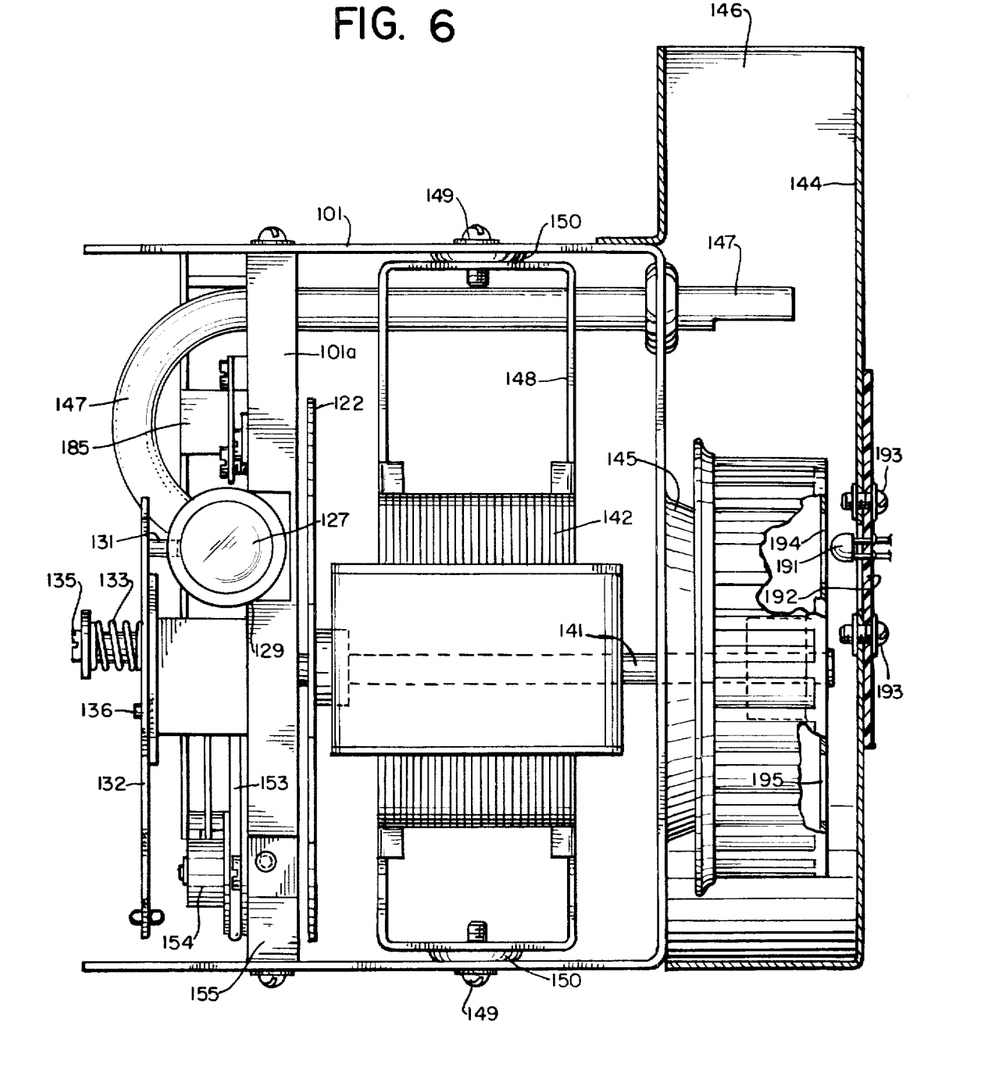
FIG. 6 is a front elevation view partly broken away of the subject motion picture projector.
Figure 7:
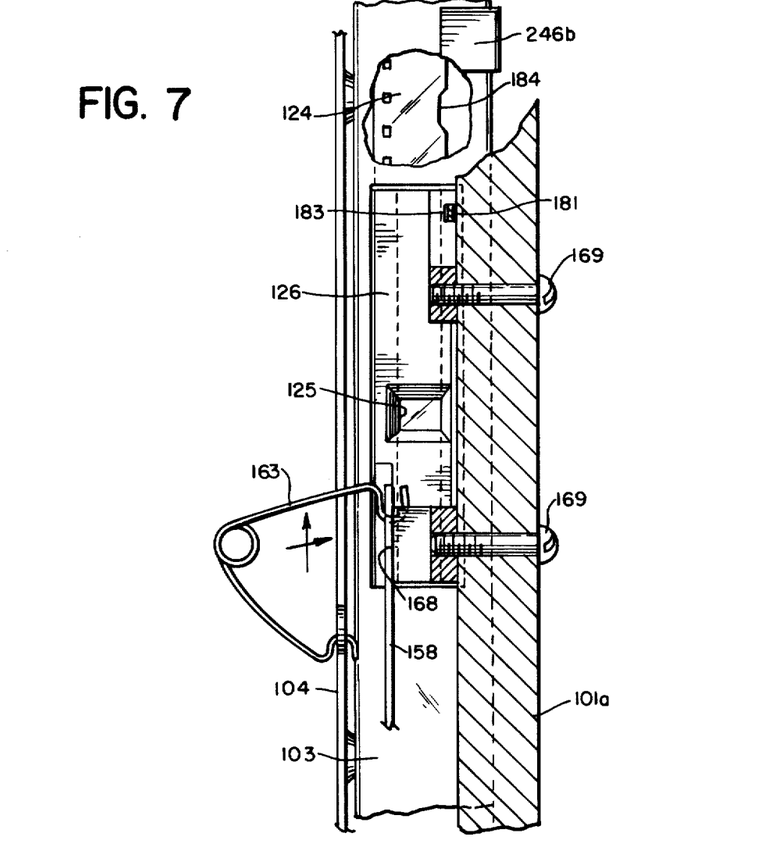
FIG. 7 is an enlarged cross-sectional view, partially broken away, taken along the line 7—7 of FIG. 4 and showing details of the film-advancing mechanism.

Although the embodiment of FIG. 1 uses a certain arrangement of the lamp 32 and condensing lens 33, film aperture 26, film 25, shutter 35 and projection lens 34, it will be appreciated that other arrangements of these projection elements may be employed within the spirit and scope of the present invention. For example, in the preferred embodiment shown in FIGS. 4–16, an elliptical reflector 115 is used rather than a condensing lens. It is also noted that the shutter 122 shown in FIGS. 4–6 is disposed between the lamp 114 and the film 124, thus reducing the problem of excessive heat as explained in greater detail hereinafter.

One embodiment of the electrical circuitry of the present motion picture projector of the system is shown in greater detail in FIG. 2. The circuit of FIG. 2 includes an oscillator 40, a chopper circuit 41, and a speed control unit 42. The oscillator 40 provides a continuous a.c. output, typically at 1,000 cycles per second, as illustrated at 43. The oscillator frequency may range from 100 hz to 3 khz or higher. A mechanical oscillator or an electronic oscillator may be used.

The output of oscillator 40 is connected to the chopper circuit 41 which functions to interrupt the continuous tone and provide tone bursts as indicated at 44, in response to control signals from the speed control 42. The chopper circuit 41 is indicated schematically as a switch 45 which is closed and opened in response to speed control signals. Any conventional chopper circuit may be used.

The speed control 42 provides for manual control of the film advance and will include an "off" condition, a single frame advance condition, and one or more continuous film advance conditions at various motion picture rates. Typically the push buttons of the speed control may be marked 0 (for off and single frame advance), and 1, 4, 8, 18 and 24, the latter five being for film advance at the designated number of frames per second. When the 1 button is depressed, the switch 45 is closed one time per second to produce tone bursts at a rate of one per second. A similar operation occurs for the buttons 4, 8, 18 and 24. Of course, any rate of film advance can be selected as desired. Pushing the 0 button releases the other buttons and stops film advance if the system is operating at a selected rate. If the system is not advancing the film when the 0 button is pushed, the film will be advanced one frame. A typical circuit for the speed control 42 and tone chopper 41 is shown in FIG. 3.

Referring to FIG. 3, the speed control 42 incorporates a set of push buttons identified as 0, 1, 4, 8, 18 and 24. Any one of the pushbuttons 1, 4, 8, 18 and 24 remains depressed when pushed, connecting a selected resistor into an oscillator circuit including unijunction transistor 46. The 0 button is a normally open momentary switch which closes the circuit only when the button is depressed. The push button switch mechanism provides for releasing any previously depressed button when any other button is depressed. Such push button switch mechanisms are well-known and readily available on the market.

The oscillator circuit incorporating the transistor 46 is a conventional circuit which energizes coil 47 when the transistor is conducting, to close the switch 45. The frequency of oscillation and hence the frequency of closing of switch 45 is controlled by the magnitude of the resistor switched into the circuit by a push button switch. In an alternative arrangement, a continuously variable rate could be achieved by utilizing a variable resistor in place of the switches 1, 4, 8, 18 and 24 and associated resistors. The resistor 47' controls the "on," or "transistor conducting," or "switch closed" time of the circuit. The transistor 46 must conduct for a sufficient time to permit operation of the film advance solenoid 29.

The oscillator action may be stopped by depressing the 0 button which automatically releases any other depressed switch button. Depressing the 0 button connects the coil 47 between the d.c. voltage source and ground, thus energizing the coil 47 to close the switch 45. Thus, if the coil 47 is not already energized when the 0 switch is closed, depressing the 0 button will advance the film one frame. It will be appreciated, however, that other forms of chopper circuit such as mechanically driven switches and commutator discs may be utilized, if desired.

The output of the chopper circuit 45 is connected to an amplifier and tone detector 49 which produces a square wave output, as indicated at 50, with one pulse for each burst from the chopper circuit. The output of the chopper circuit 41 may also be connected to the write head 48 of channel 1 of the recorder 10.

The read head 51 of channel 1 of the recorder is connected to another amplifier and tone detector 52 which provides a square wave output as indicated at 53, corresponding to the tone bursts 54 from channel 1.

The outputs of the detectors 49, 52 are connected to the fixed contacts of a switch 55, with the moving arm of the switch 55 connected to the coil of a relay 56, typically a read switch.

The contact set of the relay 56 is connected in series between a d.c. source terminal 57 and a capacitor 58. The capacitor 58 is also connected to a fixed contact 60 and to a contact set 61 of another relay 62. Another contact 63 is connected to the contact set 61 and to the coil of the relay 62.

The shutter 35 of the projector operates to close an electrical circuit between the contacts 60, 63 with each cycle of operation of the shutter. Typically this may be accomplished by providing an electrical conducting segment 65 on the shutter 35, with the cntacts 60, 63 positioned to ride on the shutter so that the circuit is closed therebetween when both are engaging the conducting segment 65. A blade 66 is carried by the shutter for passing through the light path of the projector to effect the blanking operation. Typically, the blade may be movable with respect to the remainder of the shutter for adjusting the timing of the operation.

Another contact set 70 of the relay 62 is connected to a d.c. source terminal 71 through a resistor 72 and is connected to the base of a power transistor 73. The solenoid 29 is connected between the terminal 71 and the collector of the transistor, with the transistor emitter connected to circuit ground. A bias voltage for the transistor 73 is provided by a d.c. power supply 74 and a resistor 75 connected between the base of transistor 73 and ground.

The system of FIGS. 1 and 2 is operated as follows. When the system is turned on, the oscillator 40 produces a continuous tone which is chopped into tone bursts by the chopper circuit 41 in response to control signals from the speed control 42. Each tone burst is recorded on channel 1 of the recorder via the write head 48 and is also converted to a square wave pulse at the detector 49.

With the switch 55 in the record (rec.) position, a square wave pulse energizes the relay 56, connecting the capacitor 58 to the d.c. source and charging the capacitor. The capacitor is discharged into the coil of the relay 62 when the circuit between the contacts 60, 63 is closed by the electrically conductive shutter segment 65.

Energization of the coil of the relay 62 closes the contact set 61 which acts as a holding circuit to fully discharge the capacitor 58 after the circuit is opened by continued shutter rotation. Energization of the coil of the relay 62 also closes the contact set 70 providing power to the transistor to energize the film advance solenoid 29 and move the claw 27 to advance the film one frame. The charge on the capacitor 58 is dissipated in the coil of the relay 62, the coil is unenergized and the contact set 61, 70 opens, turning the transistor 73 off and allowing the claw 27 to be returned to its initial position.

This cycle of film advance is repeated for each tone burst from the chopper circuit 41. When the capacitor 58 is charged and the contacts 60, 63 are not connected, the film advance movement is delayed until the shutter segment 65 rotates to close this circuit. The angular relation of shutter blade 66 to conductive segment 65 is such that the blanking of the light path is timed to coincide with the actual motion of the film in response to the energization of solenoid 29.

In a typical situation, the sound track or narration for channel 2 is recorded first. This is then played back and the film is advanced by means of the speed control 42 at the appropriate times and at the appropriate rates as desired in conjunction with the sound track. The tone bursts for producing the film advance are recorded on channel 1 in synchronism with the sound track on channel 2, in the manner described above. Alternatively, both sound track and tone bursts may be recorded simultaneously. When recording is completed, switch 55 is moved to the playback (p.b.) position. Then each time the record is played, the tone bursts from channel 1 will provide the film advance control in synchronism with the narration or other sound effects on channel 2. The tone bursts are picked up by read head 51, converted to the square wave pulses in the detector 52 and control the relay 56 in the same manner as the d.c. pulses from the detector 49.

Figure 12:
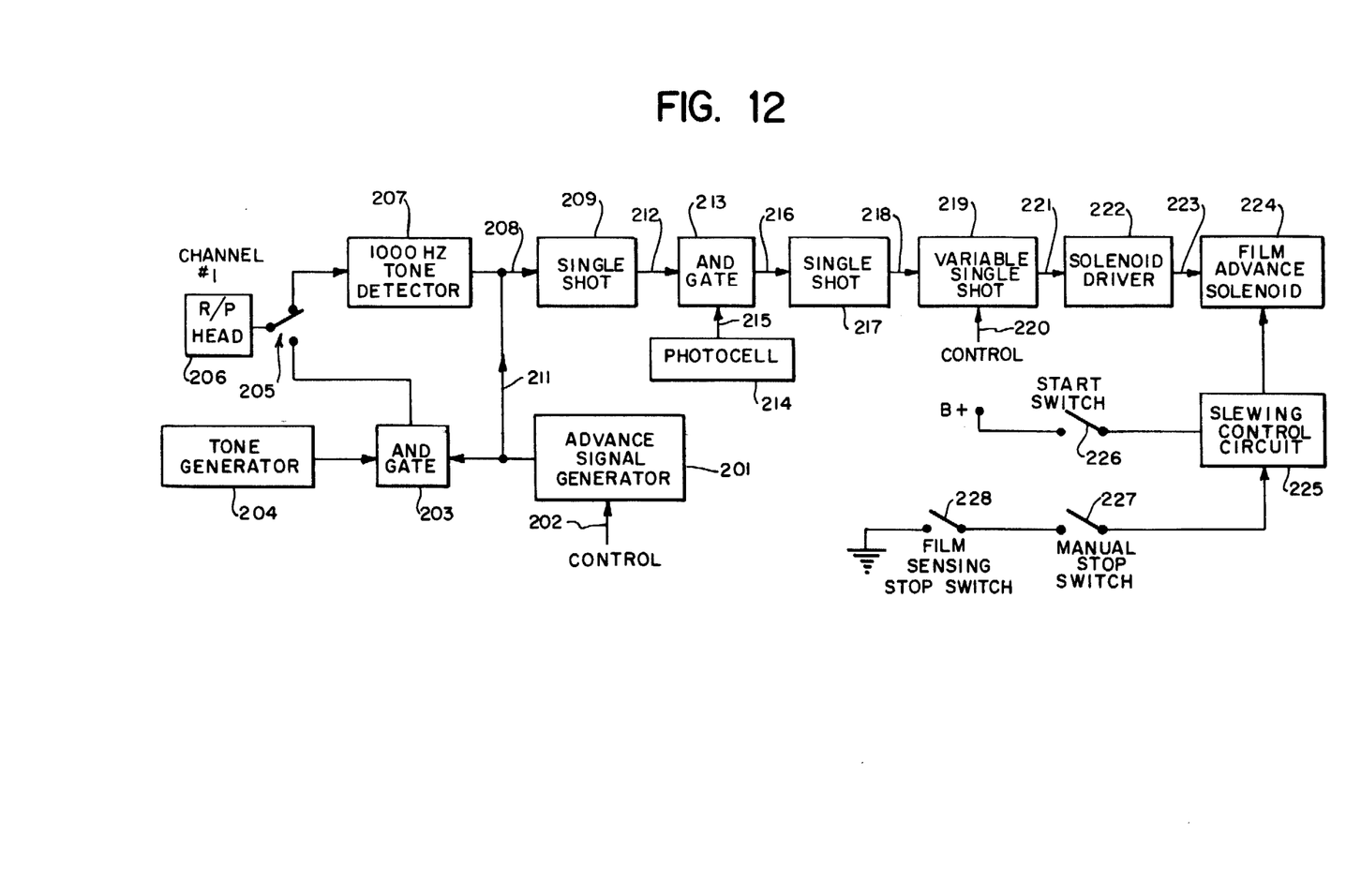
FIG. 12 is a block diagram of a portion of the control circuit of the preferred embodiment of motion projector according to the present invention.

While FIGS. 1–3 show one embodiment of control circuitry for the subject adjustable speed projector, it will be appreciated that the present invention embraces other forms of control circuits such as, for example, the control circuit shown in block diagram form in FIG. 12.

Referring now to FIGS. 4–16 of the drawings, there is shown a preferred embodiment of the present adjustable speed projector which differs in certain details from the embodiment of FIGS. 1–3. FIG. 4 is a side elevation view showing the projector frame assembly 101, which may be made of steel, aluminum or other structural material, and serves to carry the other components of the projector, which will be described in greater detail hereinafter. Frame assembly 101 includes a casting 101a which has an opening 102 to receive a film cartridge 103. The film cartridge 103 may be a standard motion picture film cartridge such as, for example, the commercially available endless loop film cartridges manufactured by the Technicolor Corporation of Hollywood, California. It will be appreciated, however, that, while the motion picture projector of FIG. 4 uses a conventional endless loop film cartridge, the principles of the present invention are also applicable to motion picture projectors using other types of film cartridges or cassettes, or reel-to-reel film supply arrangements.

The film cartridge 103 is retained in position within cavity 102 of frame 101 by a cover plate 104 and a pair of spring-loaded balls 105 and 106. The cover plate 104 is mounted on frame 101 by any suitable means such as, for example, screws 107 and 108. Referring to FIG. 5, it will be seen that ball 105 is resiliently retained within a suitably shaped and dimensioned hole 111 in frame 101 by a leaf spring 112. Ball 105 engages shoulder 113 of cartridge 103 to retain cartridge 103 in the operative position as shown.

Projection System

An electric lamp 114, shown in FIG. 5, serves as the projection light source for this embodiment. For purposes of illustration, the lamp 114 may be a quartz-halogen lamp having a dichroic elliptical reflector 115. It will be appreciated, however, that other types of projection lamps may be used within the spirit and scope of the present invention. The lamp 114 is preferably mounted on a platform 116 which is tiltable about pivots 117 and 118 so as to provide easy access for the replacement of lamp 114, when necessary.

Figure 8:
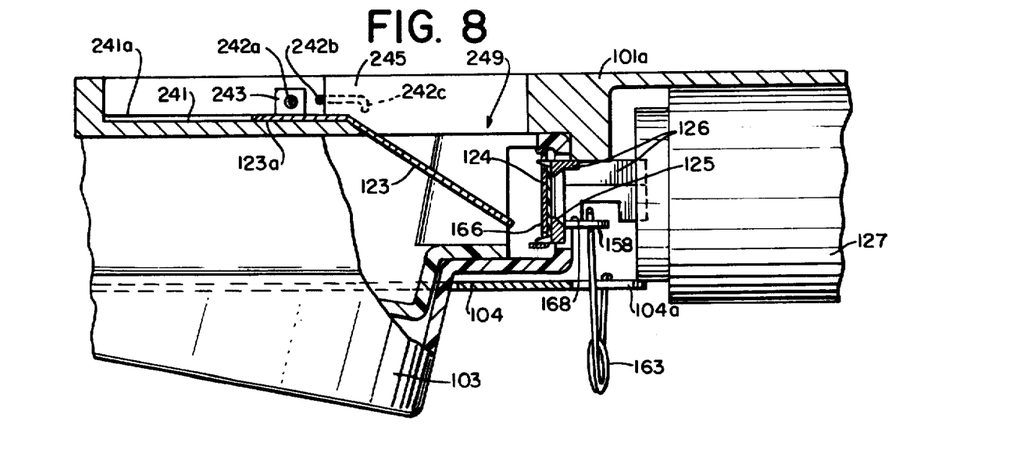
FIG. 8 is an enlarged cross-sectional view, partially broken away, taken along the line 8—8 of FIG. 4 and showing details of the projection mirror and film-advancing mechanism.
Figure 14:
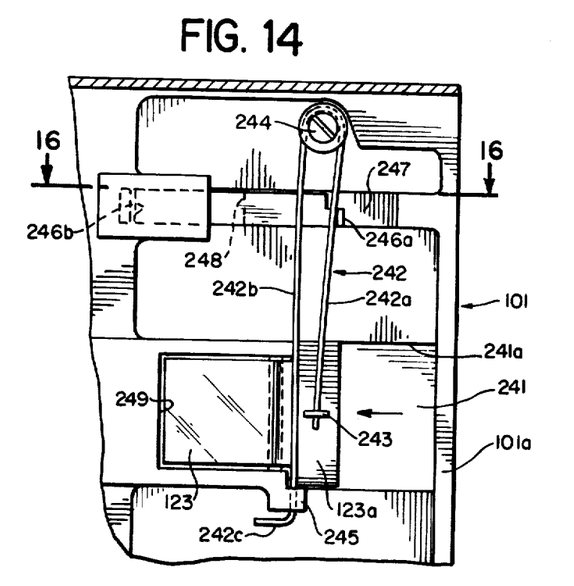
FIG. 14 is a side elevation view of a portion of the interior of the subject motion picture projector showing the retractable projection mirror in its operative position.

The light from projection lamp 114 passes through a dichroic mirror 121 and the plane of a continuously rotating shutter 122, and is reflected by the mirror 123, shown in FIGS. 4, 8 and 14, through the film 124 and film aperture 125 in aperture plate 126, and thence through projection lens system 127 to establish a projection light path. The dichroic mirror 121 serves as a heat reflector so as to prevent excessive heat from reaching the film frame to be projected, thus reducing the likelihood of buckling or damage to the film when a single frame is projected for a prolonged period time. Additional heat projection is provided by the placement of the continuously running shutter 122 between the projection lamp 114 and the film 124. The shutter 122 continues to periodically interrupt the light path even when a single frame is projected for a prolonged period.

The projection lens 127, which may be a conventional type, rests against the edges 128 and 129 of frame 101, as shown more clearly in FIG. 6. Projection lens 127 is retained in position by the action of pin 131 which projects from lever 132 and is resiliently urged against projection lens 127 by the action of spring 133. Pin 131 rides in groove 134 of projection lens 127 and thus serves to control the axial position of lens 127.

Focusing of the lens 127 is accomplished by pivoting lever 132 about screw 135, which causes the lens 127 to move in an axial direction by reason of the engagement of pin 131 with groove 134. Pin 136, which projects from frame 101 through hole 137 in lever 132 serves to limit the motion of the focusing mechanism. A rod 138 is connected to the bottom of lever 132 and extends toward the rear of the projector to provide a focus adjustment control, not shown, which is readily accessible to the operator. For example, the focus adjustment control may be an axially restrained rotatable knob which cooperates with screw threads on rod 138 to adjust the position of focusing lever 132. A tension spring 139 is connected between the upper end of lever 132 and the frame 101 of the projector in order to eliminate slack in the focusing mechanism. An advantage of the above-described focusing mechanism is that it accomplishes focusing adjustments without rotating the projection lens 127. It will be appreciated, however, that other kinds of focusing mechanisms can be used without departing from the spirit and scope of the present invention.

Shutter

Referring again to FIG. 4 of the drawings, the two-bladed continuously running shutter 122, as shown in dashed lines, rotates at a rate which is sufficiently great to prevent a viewer from perceiving flicker in the projected image. The shutter rotation rate is also sufficiently great that the projection light path is interrupted, or blanked, at a rate which is greater than the maximum film frame rate at which the projector is to be operated. For example, the shutter 122 may rotate at a constant rate of 50 revolutions per second, thus causing the projection light path to be blanked or interrupted at the rate of 100 times per second. The angular width of the shutter blades 122a is sufficient to blank or interrupt the projection light path for a time which is somewhat greater than the time that the film is in motion, as it is advanced from one frame to the next. Thus, when the film-advancing mechanism is properly synchronized to the continuously rotating shutter 122, the film is in motion only when the projection light path is interrupted by shutter 122 and the film is stationary when the projection light path is open, thus avoiding smearing of the projected image.

It will be appreciated that, although the motion picture projector of the present invention is capable of projecting motion pictures at various film frame rates under control of the operator, the shutter 122 rotates continuously, at a constant rate, the operation of the film-advancing mechanism being synchronized to the continuously rotating shutter 122 so that the film is in motion only when the projection light path is blanked. It will further be appreciated that, although FIG. 4 shows a two-bladed shutter 122, a continuously rotating shutter having one blade, or three or more blades, may be used within the spirit and scope of the present invention. While such a rotating shutter is preferred for its simplicity and effectiveness, it will be understood that other shutter arrangements may be used, running continuously at either constant or varying speeds.

Ventilation

Referring to FIGS. 5 and 6 of the drawings, it will be seen that the continuously rotating shutter 122 is mounted on the drive shaft 141 of electric motor 142. A centrifugal blower 143 is mounted at the opposite end of drive shaft 141. The blower 143, which is enclosed in a suitable housing 144, draws cooling air through the projector via port 145 in a portion of the frame assembly 101 and exhausts the air through exhaust vent 146. A portion of the exhaust air is carried by duct 147 to blow against the film 124 in aperture 125 shown in FIG. 4 for the purpose of preventing heat damage to the film and reducing the problem of defocusing the system due to heat buckling of the film when a single frame is projected for a prolonged period of time.

The motor 142, which may be of a conventional type such as a two pole, shaded pole motor, is mounted by a bracket 148 to the frame assembly 101 of the projector by suitable means such as, for example, screws 149. Rubber bushings 150 are mounted between bracket 148 and frame assembly 101 in order to reduce vibration and noise.

Film Advancing Mechanism

Referring again to FIG. 4 of the drawings, the film-advancing mechanism of the present motion picture projector includes a pulley wheel 152 which is mounted on the end of drive shaft 141 and is thus driven by the motor 142 shown in FIGS. 5 and 6. Pulley 152 is connected by a belt 153 to pulley wheel 154 which is rotatably mounted on a shaft mounted on a support member 155 and serves as a drive wheel for the film-advancing mechanism. The drive belt 153 may be made of rubber or other suitable material and may be easily replaced when worn. The position of support member 155 may be adjusted relative to the casting 101a by means of a screw 156 in order to bring about the correct relationship between the drive wheel 154 and the cam wheel 157 to which the film-advancing claw 158 is eccentrically mounted by means of a pin 159.

The cam wheel 157 is rotatably mounted on a casting 161 which also carries the solenoid 162 which controls the operation of cam wheel 157 as will be explained more fully hereinafter. As shown in greater detail in FIG. 9, the cam wheel 157 has a circular portion, or lobe 157a, and a flat portion, or dwell 157b. The distance between drive wheel 154 and cam wheel 157 is adjusted by means of screw 156, shown in FIG. 4, so that when the cam wheel 157 is in its rest position as shown in FIGS. 4 and 9, the dwell 157b is out of contact with the drive belt 153, but when the cam wheel 157 is permitted to rotate through a small angle, the lobe 157a will come into driving engagement with belt 153, thus causing the cam wheel 157 to be driven by frictional engagement with belt 153 in a counterclockwise direction for one revolution.

Figure 9:
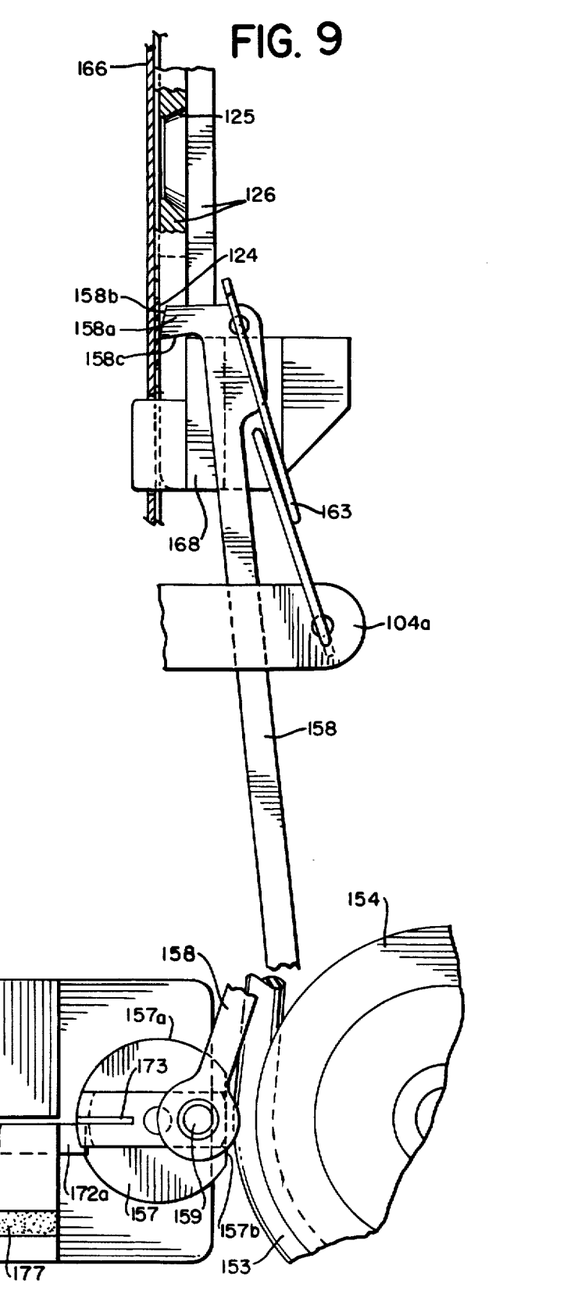
FIG. 9 is an enlarged side elevation view, partially broken away, showing details of the film-advancing mechanism shown in FIG. 4.
Figure 10:
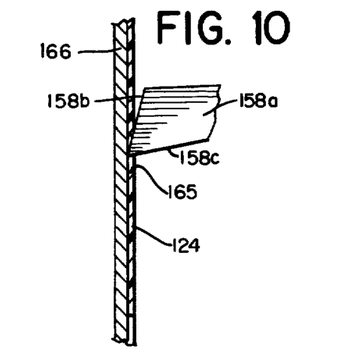
FIG. 10 is a greatly enlarged side elevation view of the tip of the film-advancing claw at the upwardmost limit of its travel.
Figure 11:
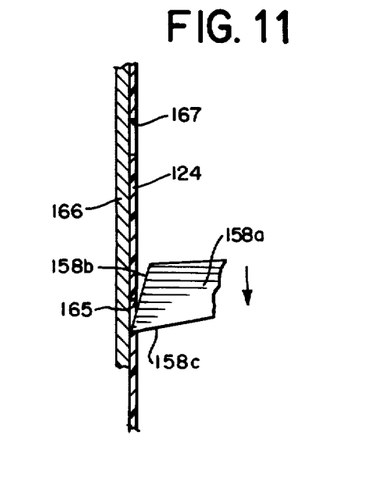
FIG. 11 is a greatly enlarged side elevation view of the tip of the film-advancing claw at the downwardmost limit of its travel.

As the cam wheel 157 is driven in a counterclockwise direction from its rest position shown in FIGS. 4 and 9, the film-advancing claw moves upward by reason of its eccentric connection to cam wheel 157. The tip 158a of claw 158 is urged against the film 124 by the action of the spring 163 which is connected between the upper end of claw 158 and the projection 104a of the cover plate 104 shown in FIG. 4. The upward motion of claw 158 continues for about 90° of revolution of cam wheel 157. Near the end of the upward travel of claw 158, the tip 158a enters a sprocket hole 165 of film 124 as shown in FIG. 10. A certain amount of upward overtravel is provided in order to insure proper engagement of the claw tip 158a with the sprocket hole 165. For example, in the case of conventional "Super 8" film, an upward overtravel of 0.02 inch may be provided. When claw tip 158a enters sprocket hole 165, it bears against the pressure plate 166 which lies immediately behind, and supports the film 124. The end of claw tip 158a may be slightly flattened to avoid undue wear on pressure plate 166.

In the embodiment shown in FIGS. 4–16, pressure plate 166 is an element of the film cartridge which has been chosen for purposes of illustration. It will be appreciated, however, that in the case of film cartridges, cassettes or reels which do not include suitable pressure plates, a pressure plate may be provided as a part of the structure of the projector, or other means may be used to restrain the claw tip 158a from penetrating too deeply through the film sprocket holes.

As the rotation of cam wheel 157 continues, claw 158 moves downward and the lower, film engaging surface 158c of claw tip 158a engages the lower edge of sprocket hole 165 to draw the film 124 downward. The lower surface 158c of claw tip 158a preferably engages a large portion of the width of the lower edge of sprocket hole 165 so as to avoid undue wear and tear on film 124. The lateral alignment of claw tip 158a with the film sprocket holes 165,167 is assured by surface 168 of aperture plate 126 against which the claw 158 is resiliently urged by the action of spring 163 as illustrated more clearly in FIG. 7.

The downward motion of claw 158 continues until cam wheel 157 has rotated about 270° from its rest position shown in FIGS. 4 and 9. At this point, the film 124 has been advanced by one frame so that a new frame is registered in film aperture 125 of aperture plate 126 which is mounted on casting 101a by means of screws 169.

As the rotation of cam wheel 157 continues, the claw 158 again moves upward causing claw tip 158a to withdraw from sprocket hole 165 by the action of cam surface 158b of claw tip 158a against the upper edge of sprocket hole 165. When the cam wheel 157 again reaches the rest position shown in FIGS. 4 and 9, the claw tip 158a will rest at a position intermediate between sprocket hole 165 and the next sprocket hole 167.

Referring again to FIGS. 4 and 9, the cam wheel 157 is controlled by the solenoid 162. The tip 172a of solenoid plunger 172 is urged into engagement with the dog 173 of cam wheel 157 by the action of compression spring 174. A set screw 175 is provided in order to permit adjustment of the compression of spring 174. The dog 173 is preferably made of a shock-resistant material, and the guide member 176 for plunger 172 conventional mounted on a block 177, made of rubber, or other energy-absorbing material, in order to absorb the shock that occurs when dog 173 engages the plunger tip 172a after a revolution of the cam wheel 157.

When the solenoid 162 is energized by a suitable actuating signal, the plunger 172 retracts, thus disengaging plunger tip 172a from dog 173. The cam wheel is then urged to rotate in a counterclockwise direction by the upward force of spring 163 on claw 158. This initial rotation of cam wheel 157, caused by spring 163, brings the lobe 157a into driving engagement with belt 153, thus causing the continued rotation of cam wheel 157 as described in greater detail hereinabove. During normal film-advancing operations, the actuating signal terminates, thus de-energizing the solenoid 162 well before the cam wheel 157 completes one revolution. When the solenoid is de-energized, the plunger 172 is returned by compression spring 174 to the rest position shown in FIGS. 4 and 9 so that the dog 173 will engage plunger tip 172a, thus stopping the cam wheel 157 after precisely one revolution.

In the motion picture projector shown in FIGS. 4-11, synchronization between the film-advancing mechanism and the continuously running shutter 122 is accomplished with the aid of a photocell 191 shown in FIG. 6. The photocell 191, which may be of a conventioonal type, is mounted on a supporting member 192 which is in turn mounted on the blower housing 144 by means of suitable fastening devices, such as screw fasteners 193. The photocell 191 is activated by stray light from the projection lamp 114 (shown in FIG. 5) which passes through a pair of relatively narrow slots or openings 194 and 195 in blower wheel 143. Thus, the photocell 191 delivers output electrical pulses twice during each revolution of the blower wheel 143, each pulse corresponding to an interruption of the projection light path by the continuously rotating shutter 122.

Control Circuit

Referring now to FIG. 12 of the drawings, there is shown a block diagram of a portion of the electronic control circuitry of the motion picture projector shown in FIGS. 4-11. The advance signal generator 201 provides single-frame advance signals or a train of advance signals at various rates under control of the operator symbolized by arrow 202. The output from advance signal generator 201 is in the form of single pulses or trains of pulses which are applied to AND gate 203 which also receives the output from a tone generator 204. The output signal from tone generator 204 may be, for example, a continuous 1,000 hz tone, although frequency is not critical. The output from AND gate 203 is in the form of tone bursts having a width which is determined by the width of the advance pulses from advance signal generator 201, and a frequency determined by tone generator 204. By appropriate positioning of record/playback switch 205, the output signals for AND gate 203 may be recorded on an appropriate storage medium, such as for example, magnetic tape, by means of record/playback head 206.

As explained above in connection with FIGS. 1 and 2, the advance signals may be recorded on one channel of a magnetic tape while audio information is simultaneously recorded on another channel, so that, when the magnetic tape is played back, the recorded advance signals may be used to control the film frame rate of the projector in synchronism with the audio information in the manner programmed by the operator during the recording of the audio information. On playback, the advance signals, or tone bursts, recorded on the magnetic tape are picked up by record/playback head 206 and fed through record/playback switch 205 to a tone detector 207 which is matched to the frequency of tone generator 204. The resulting output pulses are applied via line 208 to single shot 209. The output signals from advance signal generator 201 are also applied directly, via lines 211 and 208 to single shot 209 in order to permit direct control of the film frame rate of the present motion picture projector during the simultaneous recording of the audio information and the advance signals and at the times when the present adjustable speed projector is operated as a silent projector.

Figure 13:
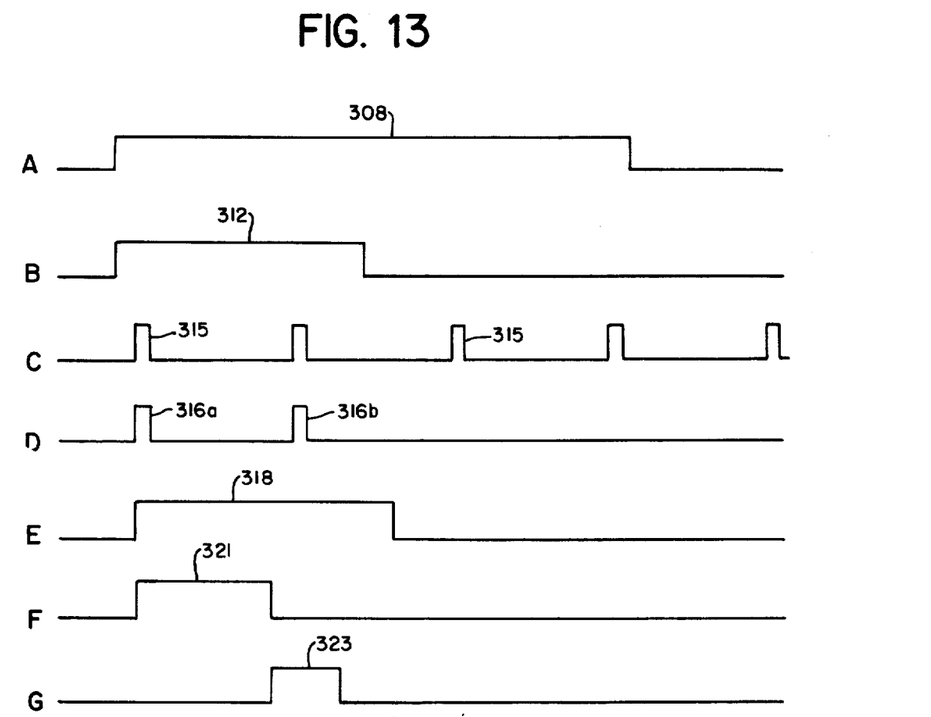
FIG. 13 is a timing diagram showing the signals at various points in the control circuit of FIG. 12 as functions of time.

FIG. 13 is a timing diagram showing the signals at various points in the control circuit of FIG. 12 as functions of time. For example, FIG. 13A shows an advance signal 308 as it appears on line 208 of FIG. 12. The width of advance signal 308 is not critical. It should be sufficient to trigger single shot 209, but not greater than the interval between film frames at the maximum film frame rate.

The output signal from single shot 209 is applied via line 212 to AND gate 213 which also receives synchronizing signals via line 215 from photocell 214 which corresponds to photocell 191 shown in FIG. 6. The signal on line 212 is represented by the pulse 312 shown in FIG. 13B, while the signal on line 215 is represented by the train of pulses 315 shown in FIG. 13C. The width of the pulse 312 from single shot 209 (FIG. 12) is selected so as to insure that pulse 312 coincides with at least one, and preferably no more than two, of the synchronizing pulses 315 from phtocell 214 (FIG. 12). Therefore, the width of pulse 312 is preferably slightly greater than the time interval between two successive synchronizing pulses 315 and slightly less than the time interval between three successive synchronizing pulses 315. In the case of a motion picture projector having a shutter rate of approximately 100 cps, the width of pulse 312 will be in the range from 10 ms to 20 ms.

The output from AND gate 213 (FIG. 12) appears on line 216 and is represented by pulses 316 shown in FIG. 13D. It will be appreciated that, on occasions when pulse 312 begins immediately after the preceding photocell pulse 315, there will be only one output pulse from AND gate 213 corresponding to the particular advance signals represented by the pulse 312 of FIG. 13B. On other occasions, such as that illustrated in FIG. 13D, there will be two output pulses 316 from AND gate 213 (FIG. 12) corresponding to the particular advance signal represented by pulse 312 of FIG. 13B. In order to avoid an unwanted second actuation of the film advancing mechanism in such situations, it is necessary to suppress the second output pulse 316 from AND gate 213. This is accomplished by single shot 217 shown in FIG. 12 which responds to the first output pulse 316A from AND gate 213 to produce a pulse 318, illustrated in FIG. 13E, having a width equal to the width of the output pulse 312 from single shot 209. Because the single shot 217 remains "on" for a period of time greater than the interval between two successive synchronizing pulses 315 from photocell 214, the second output pulse 316B from AND gate 213 does not affect the signal 318 which appears on the output line 218 of single shot 217.

Synchronization

In the preferred form of the present adjustable speed projector, appropriate synchronization of the actuating signals applied to the film advance solenoid 224 with respect to the interruptions of the projection light path by the continuously rotating shutter 122 (shown in FIGS. 4-6) is accomplished by an electronic delay device under control of the operator. The proper timing of the solenoid actuating signals in relation to the interruptions of projection light path by shutter 122 is determined by a number of fixed delay factors, including: the time required to build up an adequate magnetic field in the solenoid 162 to initiate movement of the plunger 172, the time required for the plunger 172 to move a sufficient distance to release the dog 173 of cam roller 157, and the time required for the film-advancing claw 158 to go through its preliminary upward travel before it actually starts pulling the film 124. Thus, the actuating signals to the solenoid must precede the interruption of the projection light path by shutter 122 by a predetermined amount so that the interruption of the light path will be synchronized with actual movement of the film.

Referring to FIG. 12, the signals on line 218 are applied to a variable single shot circuit 219 which serves as an electronic delay device. Single shot 219 produces output pulses of variable width under the control of the operator symbolized by arrow 220. The output signal from variable single shot 219 appears on line 221 and is illustrated by pulse 321 shown in FIG. 13F. A solenoid driver 222 is connected to line 221 and responds to the end of the variable width pulse 321 to produce an output pulse 323 (FIG. 13G) on line 223 for energizing film advance solenoid 224 (FIG. 12). The width of the output pulse 323 from solenoid driver 222 must be sufficient to energize the solenoid coil 162 (shown in FIGS. 4 and 8), to retract plunger 172 and thereby permit rotation of cam wheel 157, but short enough to release plunger 172 before cam wheel 157 completes a full revolution so that tip 172A of plunger 172 will engage dog 173 of cam wheel 157 as described in greater detail hereinabove. It will also be appreciated that the power level of solenoid driver pulse 323 will normally be much greater than the power of the other signals shown in the timing diagram of FIG. 13.

While the control circuit of FIG. 12 includes the variable delay device 219 in the signal chain between AND gate 213 and solenoid 224, it will be appreciated that adjustment of the phase of the signals for actuating solenoid 224 might be accomplished equally well by a suitable variable delay device in a circuit between photocell 214 and AND gate 213.

Alternatively, adjustment of the relative time of occurrence of the solenoid actuating signals might be accomplished by mechanical methods. For example, referring to FIG. 6 of the drawings, the angular relation of slots 194 and 195 in blower wheel 143, can be adjusted with respect to the position of blades 122a of shutter 122 by loosening either the blower wheel 143 or the shutter 122 and rotating it slightly on drive shaft 141. Alternatively, the position of support member 192 and photocell 191 can be adjusted with respect to the blower wheel 143 by loosening the fastening devices 193 which retain the support member in position on blower housing 144.

Slewing

Referring again to FIGS. 4 and 8 of the drawings, it is a feature of the present invention that the film 124 may be advanced at a rapid rate, or "slewed", for example to rapidly return the film to its starting position, by continuously energizing the solenoid 162 for a prolonged period, thus causing the plunger 172 to remain retracted for a number of revolutions of the cam wheel 157. Such "slewing" of the film need not be synchronized with the continuously rotating shutter 122, in which case smearing may be apparent in the projected image. The speed of "slewing" is determined by the speed of the motor 142 and the relative sizes of pulleys 152 and 154 and cam wheel 157, rather than by the rate of actuating signals applied to the solenoid 162.

Referring again to FIG. 5 of the drawings, a resilient film-sensing finger 181 is provided for sensing the edge of the film 124 in cartridge 103. The film-sensing finger 181 is mounted on the projector frame 101 by a screw clamp 182, or other suitable device, and extends through an opening 183 in aperture plate 126, as shown in greater detail in FIG. 7. When the film-sensing finger 181 senses a notch in the edge of the film such as notch 184 shown in FIG. 7, the finger 181 moves to operate the microswitch 185, as shown in FIG. 5, which serves to cut off the energizing current to solenoid 162, thus stopping the film at a position determined by the notch 184. For example, in the case of an endless loop of film, it may be desirable to place the notch so that the film stops with the first frame of the program in the film aperture 125.

Referring again to FIG. 12 of the drawings, "slewing" of the film is controlled by switches 226, 227 and 228, and slewing control circuit 225 which is connected to the film advance solenoid 224. In order to start slewing the operator closes switch 226 which connects the current source +B through the slewing control circuit 225 to continuously energize the film advance solenoid 224 to provide continuous rotation of the cam wheel 157 (FIGS. 4 and 8), as explained above. Slewing may be stopped by the operator by opening switch 227 which operates through slewing control circuit 225 to deenergize solenoid 224. Alternatively, slewing may be stopped by the opening of the film-sensing switch 28 which corresponds to the microswitch 185 shown in FIGS. 4 and 5.

Framing

Referring again to FIG. 4 of the drawing, precise framing of the film frames in film aperture 125 is accomplished by moving the end 188 of casting 161 up or down, so as to pivot the casting 161 about the point 189, at which it is mounted to the projector frame 101 by suitable means, not shown. The pivoting of casting 161 about point 189 causes the cam wheel 157 to move up or down a slight amount, thus raising or lowering the limits of travel of the film-advancing claw 158 so that precise framing can be accomplished.

Retractable Projection Mirror

Referring now to FIG. 14 of the drawings, there is shown a side elevation view of the reverse side of the casting 101A from that shown in FIG. 4, including the retractable projection mirror 123 shown in its operative position. The base portion 123A of mirror 123 rides in a relatively wide, shallow groove 241 in casting 101A and is guided by the sides 241A of groove 241. The mirror base 123A is retained in position by the action of a spring 242, one leg 242A, of which engages the eye 243 which projects from the mirror base portion 123A as shown more clearly in FIG. 8. Spring 242 is retained in position by a retaining screw 244 and a projection 245 of casting 101A which engages the legs 242B of spring 242 at a point near its end 242C. The end 242C of spring 242 is bent at approximately right angles to the leg 242B and the tip of end 242C bears against casting 101A so as to place a torque on leg 242B which is transmitted to leg 242A to urge the mirror base portion 123A against the bottom of groove 241.

Mirror 123 is moved to its operative position, as illustrated in FIG. 8 and 14, by means of an actuating piece 246 which rides in a groove 247 in casting 101A. The actuating piece 246 has a first tab 246A which projects from piece 246 at approximately right angles to engage light 242A of spring 242, and a second tab 246B which projects from piece 246 at approximately right angles in the opposite direction and extends through an appropriate opening 248, shown in dashed lines, in casting 101A to engage the forward end of film cartridge 103 as it is inserted into its operative position in cavity 102 of casting 101A. The speed advantage provided by leg 242A of spring 242 insures that mirror 123 will have moved fully to its operative position shown in FIGs. 8 and 14 by the time the cartridge 103 reaches its proper operative position as shown, for example, in FIG. 8. When in its operative position, the mirror 123 extends through an opening 249 in casting 101A. The angle of mirror 123 with respect to the mirror base portion 123A is such that mirror 123 will reflect the light from lamp 114 as shown in FIG. 5 through the film 124 in a direction substantially parallel to the axis of projection lens 127.

Figure 15:
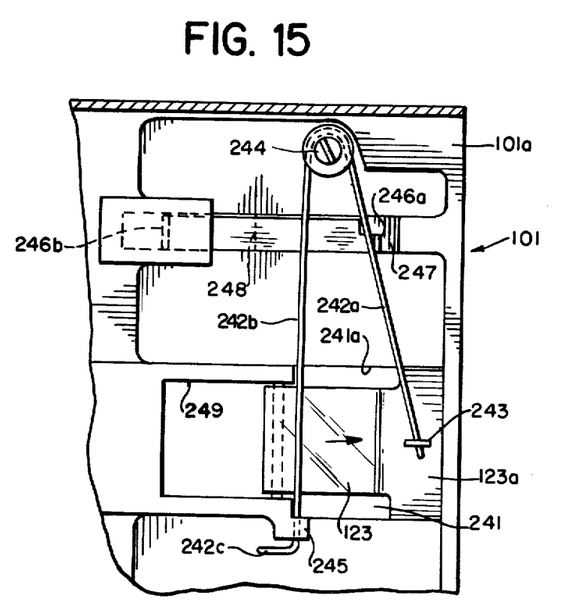
FIG. 15 is a side elevation view of a portion of the interior of the subject motion picture projector showing the retractable projection mirror in its retracted position.
Figure 16:
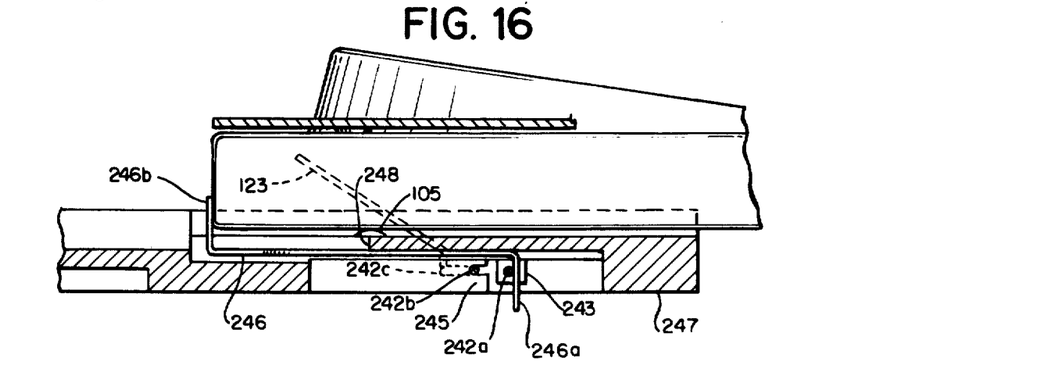
FIG. 16 is a cross-sectional view taken along the line 16—16 of FIG. 15.

FIG. 15 shows the projection mirror mechanism with the projection mirror 123 in the retracted position. FIG. 16 is a cross-sectional view taken along the line 16—16 of FIG. 15. As in the case of the movement of the projection mirror 123 to its operative position shown in FIGS. 8 and 14, the speed advantage provided by leg 242A of spring 242 causes the projection mirror 123 to be retracted from opening 249 in casting 101A more rapidly than the film cartridge 103 (FIG. 4) is withdrawn from cavity 102. As the cartridge 103 is withdrawn, tab 246B of actuating piece 246 is caused to follow the film cartridge 103 by the action of leg 242A of spring 242. Thus, actuating piece 246 and mirror 123 move from the position shown in FIG. 14 to the position shown in FIG. 15 as the cartridge 103 is withdrawn. A principal advantage of the projection mirror mechanism of the subject motion picture projector is the extreme simplicity of its construction which requires only three moving parts, namely, mirror 123, actuating piece 246 and spring 242. This simplicity of construction is made possible by spring 242, which performs multiple functions, including: urging mirror base portion 123A against the bottom of groove 241 to insure proper alignment of the mirror 123 when in the operative position shown in FIGS. 8 and 14; providing a mechanical connection between actuating piece 246 and projection mirror 123 with a sufficient speed advantage to insure that the mirror 123 will be moved from its retracted to its operative position, and vice versa, with sufficient speed to avoid interference with the cartridge 103; providing the force for urging actuating piece 246 and projection mirror 123 from their operative to their retracted positions; and retaining projection mirror 123 and actuating piece 246 within their respective grooves 241 and 247 in casting 101A of the projector frame.

Another advantage of the projection mirror mechanism of FIGS. 14–16 is that it requires very little space in a direction perpendicular to the casting 101A, thus permitting the advantageous arrangement of the design of the projector, particularly the placement of continuously running shutter 122 between the projection lamp 114 (FIG. 5) and the projection mirror 123.

Thus, the control system of the present motion picture projector permits operating the film at various rates while operating the sound system at a continuous rate as is necessary to obtain the audio reproduction. The film may be viewed a single frame at a time, with one frame projected for any desired length of time. The film may be operated at a low rate, at the normal rate, and at a high rate, as desired. These rates may be selected and changed without affecting the sound channel. Still pictures may be utilized in the same manner as a slide show in connection with an extensive narration, thereby effecting considerable savings in film cost.

One of the advantages of the projector is the ability to record narration while actually viewing the picture. With switch 55 (shown in FIG. 1) in the record position, the picture may be viewed silently (recorder disconnected) while preparing a script of the planned narration. A study of the film in this manner determines which scenes may best be shown in slow motion, still projection or normal movie, together with narration or sound effects. On connecting the recorder, a permanent record of the program may be made by viewing the film, selecting the film rates, and talking into the microphone.

A pre-recorded sound track could be prepared and the picture control track added later, but this would be a more difficult procedure. A master recording can be made and duplicated for control of identical production films.

The ability to view the picture and make simultaneous recordings enables even an amateur to narrate home movies and have immediate playback control. The only investment would be film and magnetic tape. The simplicity of the system compares favorably with conventional systems which cost up to several thousand dollars to produce a sound film.

Although an exemplary embodiment of the invention has been disclosed and discussed, it will be understood that various changes, modifications and substitutions may be made in the system without necessarily departing from the spirit of the invention. By way of example, a mechanical switch could readily be used in place of the electrical switch of the shutter, with a cam element on the shutter moving the contacts 60,63 into engagement with each other. A variety of circuitry is readily available for use in the oscillator, chopper, amplifier and detector, speed control, etc. and the present invention is not intended to be limited to any specific form for these components.

While the principle of the present invention has been illustrated by reference to a preferred embodiment and several modifications thereof, it will be appreciated by those skilled in the art that other modifications and adaptations of the present motion picture projector may be made without departing from the spirit and scope of the invention, which is set forth with particularity in the appended claims.

What is claimed is:

1. A one-cycle drive mechanism comprising:
   a continuously rotating drive wheel;
   a driven member;
   a cam wheel having a lobe and a dwell, said cam wheel being mounted so that said lobe of said cam wheel is capable of engagement with said continuously rotating drive wheel and said dwell of said cam wheel is not capable of engagement with said continuously rotating drive wheel, said driven member being eccentrically connected to said cam wheel; and
   means for normally retaining said cam wheel in an angular position such that said dwell is nearest said drive wheel, said retaining means being responsive to an actuating signal to release said cam wheel to allow said dwell to engage said drive wheel to turn said cam wheel through one revolution.

2. The one-cycle drive mechanism of claim 1 wherein said retaining means comprises:
   a solenoid having a coil and a plunger;

means for resiliently urging the plunger of said solenoid into engagement with said cam wheel for retaining said cam wheel in an angular position such that the dwell of said cam wheel is nearest said drive wheel;

said coil of said solenoid being connected to said actuating means to release said plunger from said cam wheel in response to an actuating signal.

3. The one-cycle drive mechanism of claim 2 further comprising means for resiliently urging said lobe of said cam wheel toward engagement with said continuously rotating drive wheel when said cam wheel is in the angular position such that said dwell is nearest said drive wheel.

4. The one-cycle drive mechanism of claim 1 wherein said driven member comprises a movable claw member disposed on one side of the film for engaging the sprocket holes of the film; and further comprising means for resiliently urging said claw member toward said film.

5. The one-cycle drive mechanism of claim 1 wherein the tip of said claw member has a cam surface for causing said claw member to disengage from the sprocket hole of the film during return travel.

6. The one-cycle drive mechanism of claim 1 further comprising:
a pressure plate for contacting the opposite side of the film from said claw member such that the tip of said claw member rests against said pressure plate when said claw member engages a sprocket hole of the film.

7. The one-cycle drive mechanism of claim 2 further comprising:
a guide surface aligned with the sprocket holes of the film and extending in the direction of travel of the film, said means for resiliently urging said claw member toward said pressure plate also serving to resiliently urge said claw member against said guide surface.

8. The one-cycle drive mechanism of claim 1 further comprising:
a source of actuating signals having a repetition rate controllable by an operator.

9. The one-cycle drive mechanism of claim 8 further comprising:
means controllable by an operator for continuously actuating said retaining means to permit said cam wheel to continuously engage said drive wheel to advance the film at a rapid rate.

* * * * *